US010616950B2

(12) United States Patent
Armstrong et al.

(10) Patent No.: US 10,616,950 B2
(45) Date of Patent: *Apr. 7, 2020

(54) CONTROLLING WIRELESS CONNECTION OF A DEVICE TO A WIRELESS ACCESS POINT

(71) Applicant: International Business Machines Corporation, Armonk, NY (US)

(72) Inventors: Andrew A. Armstrong, Aberdeen (GB); Richard W. Pilot, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,086

(22) Filed: May 22, 2018

(65) Prior Publication Data

US 2018/0270898 A1 Sep. 20, 2018

Related U.S. Application Data

(63) Continuation of application No. 14/835,903, filed on Aug. 26, 2015, now Pat. No. 10,009,944.

(51) Int. Cl.
*H04W 76/38* (2018.01)
*H04W 4/021* (2018.01)
(Continued)

(52) U.S. Cl.
CPC .......... *H04W 76/38* (2018.02); *H04W 4/021* (2013.01); *H04W 48/20* (2013.01); *H04W 72/085* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 6,981,126 B1 12/2005 Blodgett
7,088,966 B2 8/2006 Petersen
(Continued)

OTHER PUBLICATIONS

Naftolin et al., "Smart 'Wifi Network Available' Notifications", IP.com Disclosure No. PICOM00206698D, published May 2, 2011 (4 pages).
(Continued)

*Primary Examiner* — Mark H Rinehart
*Assistant Examiner* — Sanjay K Dewan
(74) *Attorney, Agent, or Firm* — Heslin Rothenberg Farley & Mesiti P.C.; Robert Shatto, Esq.

(57) ABSTRACT

A method is provided for controlling wireless connection of a device having a wireless communication interface to a wireless access point. The method includes: determining, by the device, if a known wireless access point is available by comparing a determined location of the device with geographical information associated with a set of known wireless access points; if the known wireless access point is available, determining, by the device, a time elapsed since a most recent data communication activity of the device; and disabling the wireless communication interface of the device if the time elapsed is less than an idle time threshold value so as to prevent wireless connection of the device to the known wireless access point.

14 Claims, 4 Drawing Sheets

(51) Int. Cl.
*H04W 48/20* (2009.01)
*H04W 72/08* (2009.01)

(58) Field of Classification Search
USPC .......................................................... 370/329
See application file for complete search history.

(56) References Cited

U.S. PATENT DOCUMENTS

| | | | |
|---|---|---|---|
| 7,606,600 | B2 | 10/2009 | Park |
| 7,826,845 | B2 | 11/2010 | Chen |
| 8,099,096 | B2 | 1/2012 | Prakash et al. |
| 8,160,638 | B2 | 4/2012 | Salowey |
| 8,504,089 | B2 | 8/2013 | Stewart |
| 8,541,751 | B2 | 9/2013 | Nishino et al. |
| 8,570,993 | B2 | 10/2013 | Austin et al. |
| 8,655,322 | B2 * | 2/2014 | Naaman ................ H04W 48/14 455/412.2 |
| 9,773,344 | B2 * | 9/2017 | Aelion .................... G06T 15/80 |
| 10,009,944 | B2 | 6/2018 | Armstrong et al. |
| 2006/0126585 | A1 | 6/2006 | Kim |
| 2006/0146773 | A1 | 7/2006 | An et al. |
| 2007/0025371 | A1 | 2/2007 | Krantz et al. |
| 2007/0041353 | A1 | 2/2007 | Li et al. |
| 2007/0203647 | A1 | 8/2007 | Mizuochi et al. |
| 2008/0117884 | A1 | 5/2008 | Ishii et al. |
| 2009/0129324 | A1 | 5/2009 | Soneda |
| 2009/0170510 | A1 | 7/2009 | Kim |
| 2011/0280219 | A1 | 11/2011 | Fashandi et al. |
| 2012/0155396 | A1 | 6/2012 | Gammon |
| 2012/0178466 | A1 | 7/2012 | You et al. |
| 2012/0322391 | A1 | 12/2012 | Suzuki |
| 2013/0064208 | A1 | 3/2013 | Futaki et al. |
| 2013/0122851 | A1 | 5/2013 | Michaelis et al. |
| 2013/0128793 | A1 | 5/2013 | Bahl et al. |
| 2014/0226572 | A1 | 8/2014 | Thota et al. |
| 2015/0085758 | A1 | 3/2015 | Pham et al. |
| 2015/0172854 | A1 | 6/2015 | Stogaitis et al. |
| 2015/0319744 | A1 | 11/2015 | Jung et al. |
| 2016/0128119 | A1 | 5/2016 | Maheshwari |
| 2017/0064723 | A1 | 3/2017 | Armstrong et al. |
| 2017/0332294 | A1 | 11/2017 | Miyagoshi et al. |

OTHER PUBLICATIONS

Pinola, "Disable the Public Wi-Fi Hotspot Feature on Your Comcast Router", Wireless Networks, http://lifehacker.com/disable-the-public-wi-fi-feature-on-your-comcas-1585025053, published Jun. 3, 2014 (2 pages).

List of IBM Patents or Applications Treated as Related, Nov. 11, 2019, 2 pgs.

* cited by examiner

CONTROLLING WIRELESS CONNECTION OF A DEVICE TO A WIRELESS ACCESS POINT

BACKGROUND

The present invention relates to the field of wireless communications, and more specifically, to the control of wireless connection between a device and wireless access point.

Modern mobile computing devices typically comprise a wireless communication interface for establishing wireless connection to a wireless access point. Connection to a wireless access point may be used to supplement or replace a connection to a network (such as the internet) provided by a different communication link (such as a mobile phone or cellular network data connection, e.g. EDGE, GPRS, 3G, 4G, etc.).

Such devices are capable of automatically detecting and connecting to an available wireless access point. Thus, as a device is moved between locations, different wireless access points may be available and the device may automatically connect to a specific or preferred wireless access point that is known to the device, for example. Repeated connection and disconnection of a device to various wireless access points may therefore occur as a device travels (e.g. carried) along a route that passes a number of wireless access points which are known to the device.

SUMMARY

According to an embodiment of the present invention there is herein provided a method of controlling wireless connection of a device having a wireless communication interface to a wireless access point. The method comprises: determining, by the device, if a known wireless access point is available by comparing a determined location of the device with geographical information associated with a set of known wireless access points. If the known wireless access point is available, a time elapsed since a most recent data communication activity of the device is determined by the device. The wireless communication interface of the device is disabled if the time elapsed is less than an idle time threshold value so as to prevent wireless connection of the device to the known wireless access point.

According to further embodiments of the invention there is herein provided a device including a wireless communication interface for wirelessly connecting to a wireless access point. The device is adapted to: determine if a known wireless access point is available by comparing a determined location of the device with geographical information associated with a set of known wireless access points. The device is also adapted to determine a time elapsed since a most recent data communication activity of the device if it is determined that the known wireless access point is available. The device is also adapted to disable the wireless communication interface of the device if the time elapsed is less than an idle time threshold value so as to prevent wireless connection of the device to the known wireless access point.

According to further embodiments of the invention there is also herein provided a computer-implementable method of controlling wireless connection of a device having a wireless communication interface to a wireless access point. There is also provided a computer program product for controlling wireless connection of a device having a wireless communication interface to a wireless access point.

BRIEF DESCRIPTION OF THE DRAWINGS

Embodiments of the present invention are described below, by way of example only, with reference to the following drawings, in which.

DETAILED DESCRIPTION

Figure 1:
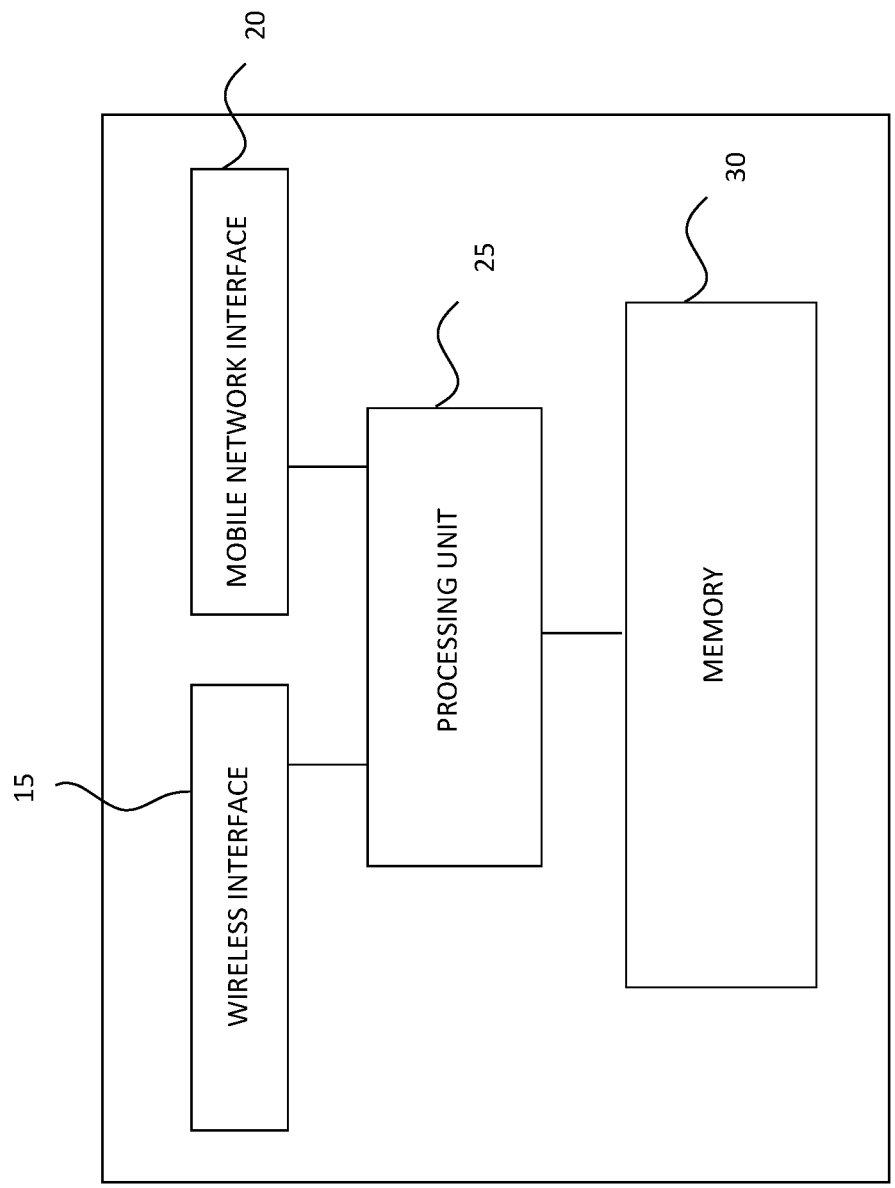
FIG. 1 schematically illustrates one embodiment of a device, in accordance with one or more aspects of the present invention.

It should be understood that the drawings are merely schematic and are not drawn to scale. It should also be understood that the same reference numerals used throughout the different figures indicate the same or similar parts.

Disclosed herein, in one or more aspects, is a method of controlling wireless connection of a device to a known wireless access point which involves disabling the wireless communication interface of the device unless data communication activity of the device has stopped for longer than an acceptable length of time. In this way, interruption of an existing or established data communication link or process of the device may be avoided, thereby improving user experience and data communication continuity and/or performance.

One or more embodiments may be adapted to determine if a wireless access point is known based on the location of the device. For example, the location of the device may be checked against geographical information associated with one or more known wireless access points to determine if the device is within an operating range of a known wireless access point. Embodiments may thus employ a concept of controlling wireless connection of a device to a wireless access point based on the location of the device. Location or areas may therefore be defined where a wireless communication interface of a device may be controlled so as to be disabled in accordance with one or more aspects of the present invention. When a device is not located at/in such a location/area, the disabling of the wireless communication interface of the device may be circumvented or bypassed, thus enabling normal operation of the device for example.

With reference to FIG. 1, a device 10 according to one embodiment of the present invention may comprise a wireless communication interface 15 for wirelessly connecting to a wireless access point. In the context of the present application, the device may be a portable computing device that may be worn or carried by a person. An example of a portable computing device is a head-mountable computing device, which comprises a device that can be worn of the head of its user and provides the user with computing and wireless communication functionality. Non-limiting examples of such head-mountable computing devices include smart headgear, e.g. eyeglasses, goggles, a helmet, a hat, a visor, a headband, or any other device that can be supported on or from the wearer's head, and so on. Another example of a portable computing device having a wireless communication interface is a smart watch, which is a device that can be worn on the wrist of it user and provide the user with computing and communication functionality (in addition to the normal time-keeping functionality of a watch or time-piece). Further examples of portable computing devices having a wireless communication interface include mobile phones, tablet computers, personal digital assistants, and laptop personal computers. The portable computing device may be configured to perform specific computing tasks as specified in a software application (app) that may be retrieved from the Internet or another computer-readable medium.

By way of example, the wireless communication interface 15 may be adapted to establish a wireless communication link using a wireless communication protocol. Any suitable wireless communication protocol may be used for wireless communication via the wireless communication interface 15, e.g., an infrared link, Zigbee, Bluetooth, a wireless local area network protocol such as in accordance with the IEEE 802.11 standards, and so on.

The device 10 may further comprise a mobile/cellular communication interface 20 for connecting to a mobile/cellular network. By way of example, the mobile/cellular communication interface 20 may be adapted to establish a communication link for communicating data using a communication protocol such as a 2G, 3G or 4G telecommunication protocol.

Alternatively, the device 10 may include a single wireless communication interface that is adapted to perform the functions of both the wireless communication interface 15 and the mobile/cellular communication interface 20 detailed above.

Turning back to the example of FIG. 1, the wireless communication interface 15 and the mobile/cellular communication interface 20 may be controlled by a processing unit 25 of the device 10. The processing unit 25 may execute instructions and/or process data stored by the processing unit 25 and/or in at least one memory unit 30 of the device. In other words, the device 10 may store (in the processing unit 25 and/or the memory unit 30) computer-readable instructions which are executable by the processing unit 25 to cause the processing unit 25 to perform operations for controlling wireless connection of the device 10 to a wireless access point in accordance with one or more aspects of the present invention.

Based on the data communication activity of the device, the processing unit 25 controls the wireless communication interface 15 when a known wireless access point becomes available for the device to wirelessly connect to. In this way, the processing unit 25 may disable the wireless communication interface 15 so as to prevent wireless connection of the device 10 to the known wireless access point. Undesired interruption of an already-established data connection (via the mobile/cellular communication interface 20 for example) may therefore be avoided, thereby improving user-experience and/or communication continuity.

This is explained below in more detail with the aid of FIG. 2, which depicts a flowchart of an example embodiment of a method 100 of controlling wireless connection of the device 10 (FIG. 1) to a wireless access point, in accordance with one or more aspects of the present invention.

The method may start in step 110 with the discovery of a wireless access point by the device 10. For example, this may occur automatically when the device 10 enters an operating range (e.g. an area surrounding the wireless access point within which the wireless signal strength exceeds an acceptable minimum value).

Next, the method progresses to step 120 in which the device determines if the discovered wireless access point is a known and available wireless access point. Such determination may, for example, be made by comparing the location of the device 10 with geographical information associated with a set of known wireless access points.

The location of the device may, for instance, be detected by identifying a wireless signal generated by the discovered wireless access point, e.g. from an interrogation of the wireless access point, comparison of one or more signals from the wireless access point with a stored database of known access points (in the memory unit 30 for example), or by requesting the wireless access point to provide geographical information and/or identification information. Additionally, or alternatively, the location of the device 10 may be determined by identifying a global positioning tracking signal, e.g. a GPS tracker signal, a GRS signal, a GLONASS signal or the like. Sensors for this may be incorporated in the device 10.

The geographical information may comprise, for each wireless access point of the set of known access points, signal strength information representative of a variation of the wireless access point's signal strength with location. In other words, the geographical information used to determine if the device 10 is within an operating range of a known wireless access point may, for instance, comprise information about wireless signal strength for the wireless access point and how that varies with location/position of the device. The signal strength information may therefore be used to determine signal strength at the location of the device and then conclude if the wireless access point is available (e.g. whether the signal strength at the device's location is good enough to meet predetermined communication requirements).

Thus, the step 120 of determining if a known wireless access point is available may comprise determining the wireless access point's signal strength at the location of the device 10 based on the signal strength information for the discovered wireless access point. If the signal strength at the location of the device 10 exceeds a minimum signal strength threshold value, it may be determined that the wireless access point is available.

If it is determined in step 120 that a known wireless access point is not available, the method may simply end so that no further action of controlling connection of the device 10 to the discovered wireless access point is undertaken. However, in alternative embodiments, if it is determined that the discovered wireless access point is not known, the discovered wireless access point may be added to the set of known wireless access points and geographical information associated with the wireless access point may be generated. This will be described in more detail below (with reference to FIG. 4).

If it is determined in step 120 that a known wireless access point is available (e.g. that the discovered wireless access point is a known access point with adequate signal strength at the device's location), the method proceeds to step 130.

In step 130, the device determines a time elapsed since a most recent data communication activity of the device 10. By way of example, the step 130 may comprise determining if the device 10 has any active data streams or connections implemented via the mobile/cellular communication interface 20. If the device 10 does have an active data stream or connection, it may be concluded that the time elapsed is a value (e.g. a zero or minimum value) that is less than an allowable (idle time) threshold value. If, on the other hand, the device 10 does not have any active data streams or connections, the time elapsed may be determined based on the time of a last (e.g. most recent) data transmission or reception made by the device 10. This may, for instance, be done by checking a data transmission log of the device or communication interface, or by referencing a time stamp of the most recent data packet transmitted/received by the device 10.

It will therefore be appreciated that step 130 may comprise the concept of determining a time elapsed since a most recent data communication activity of the device and this may be done by checking for active data streams/connections and/or determining a time elapsed since the last data transmission/reception made by the device 10.

If, as a result of undertaking step 130, it is determined that the time elapsed is less than an allowable (idle time) threshold value, the method proceeds to step 140 wherein the processing unit 25 (FIG. 1) controls the wireless communication interface 15 (FIG. 1) to be disabled. In this way, wireless connection of the device to the known wireless access point is prevented, thereby avoiding potential interruption of active data communication (via the mobile network interface for example).

Figure 2:
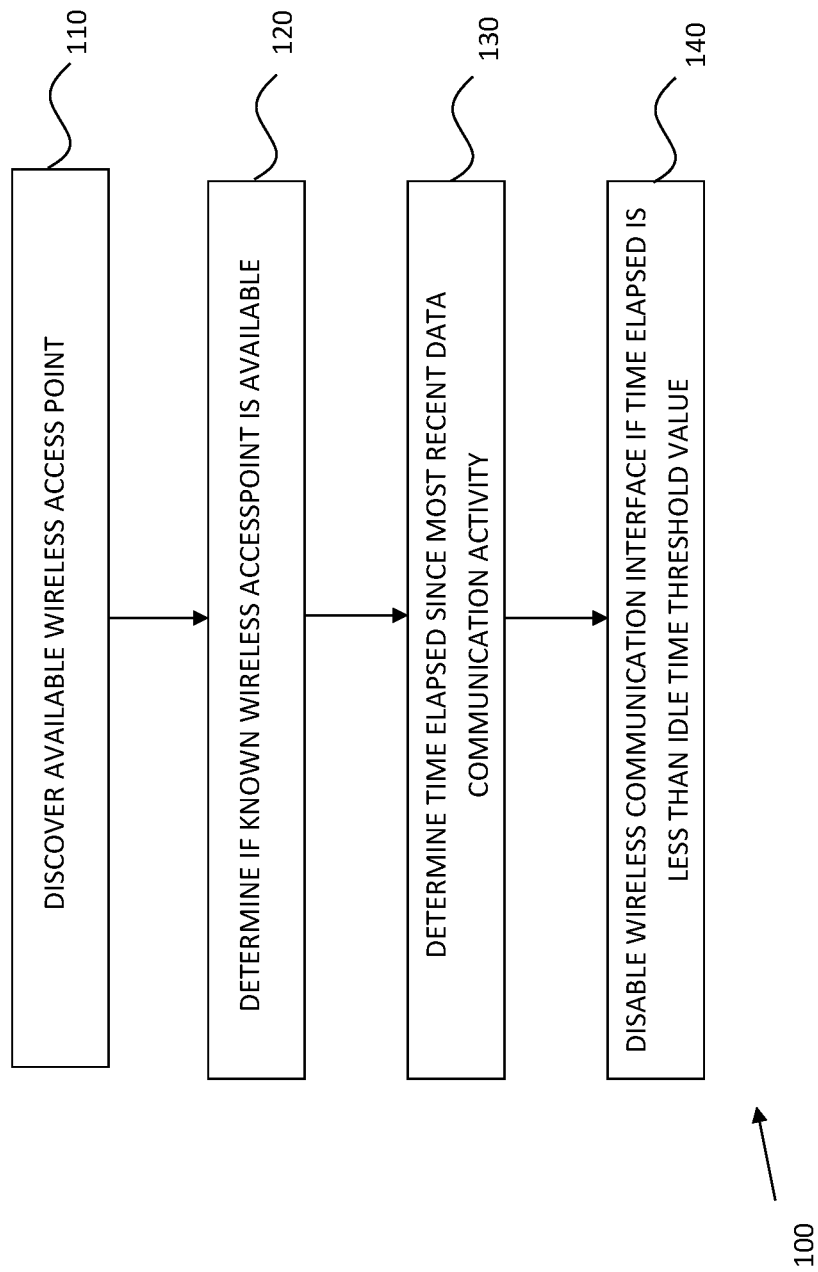
FIG. 2 is a flow chart illustrating one embodiment of a method of controlling wireless connection of a device to a wireless access point, in accordance with one or more aspects of the present invention.

From the above description of FIG. 2, it will be appreciated that a proposed embodiment for controlling wireless connection of a device may be split into two sub-routines. The first sub-routine (e.g. steps 110 and 120) may comprise the device checking if it is within a predetermined 'geofenced' area surrounding a known wireless access point. The second sub-routine (e.g. steps 130 and 140) may then comprise the device checking data communication activity and disabling the wireless interface 15 unless data communication activity has stopped for longer than an acceptable length of time (e.g. the idle time threshold value).

In some embodiments, the method 100 may then loop back to step 110 to perform repeated discovery or detection of a known wireless access point.

At this point, it is noted that the above described embodiment of the method 100 is merely an example embodiment of this method and that several extensions thereto and/or variations thereon will be immediately apparent to the skilled person.

Other suitable extensions and variations to the above disclosed embodiments will also be apparent to the skilled person.

Figure 3:
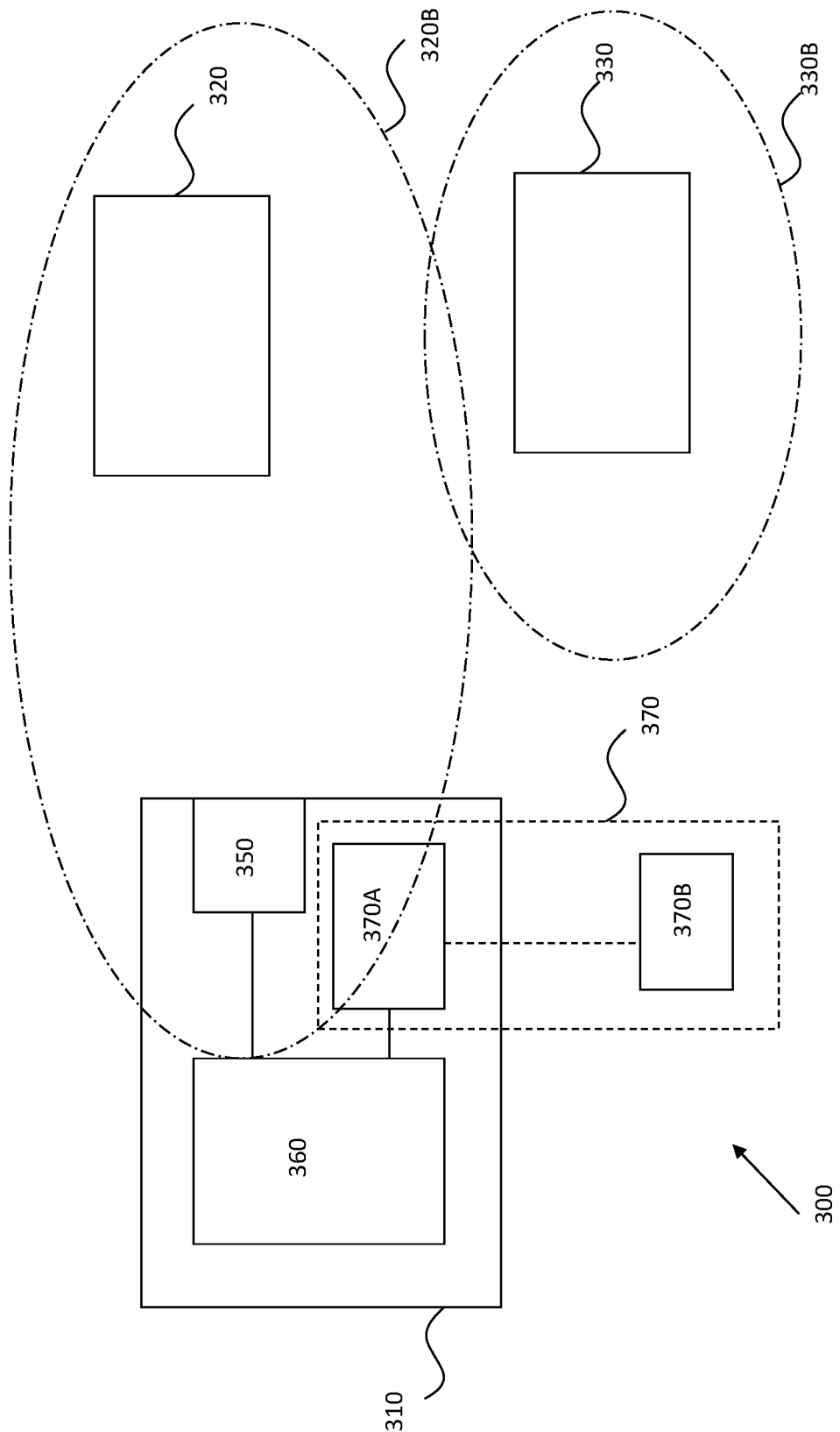
FIG. 3 schematically illustrates a network comprising a device, in accordance with one or more aspects of the present invention.

With reference now to FIG. 3, there is identified an example of a computer network 300 which may employ a device 310 and wireless access points 320, 330 according to one or more aspects of the present invention.

The computer network 300 comprises a computing device 310 having a wireless communication interface 350, processor 360, and memory 370. The computing device 310 may include, but is not limited to, a PC, a workstation, a laptop, a Personal Digital Assistant (PDA), a palm device, a server, and the like. Generally, in terms of hardware architecture, the computing device 310 may include one or more processing units 360, one or more data storage units each comprising one or more memories 370, and one or more I/O wireless communication interfaces 350 that may be communicatively coupled to a network access point 320. The wireless communication interface 350 can be, for example but not limited to, one or more buses or other wireless connections, as is known in the art. The wireless communication interface 350 may have additional elements, such as controllers, buffers (caches), drivers, repeaters, and receivers, to enable communications. Further, the wireless communication interface 350 may include address, control, and/or data connections to enable appropriate communications among the aforementioned components.

The exemplary processing unit 360 may comprise a single processing unit 360 and be associated with data storage unit 370, the data storage unit comprising a first, local memory 370A and a second, remote memory 370B. The data storage unit 370 and the processing unit 360 may be considered together, so as to cohesively form a device controller that is adapted to control operation of the wireless communication interface 350.

The processing unit 360 is a hardware device for executing software (such a computer implemented method according to one or more aspects of the present invention) that can, for example, be stored in the data storage unit 370. The processing unit 360 can be virtually any custom made or commercially available processor, a central processing unit (CPU), a digital signal processor (DSP), or an auxiliary processor among several processors associated with the computing device 310, and the processing unit 360 may be a semiconductor-based microprocessor (in the form of a microchip) or a microprocessor.

The data storage unit 370 can include any one or combination of volatile memory elements (e.g., random access memory (RAM), such as dynamic random access memory (DRAM), static random access memory (SRAM), etc.) and nonvolatile memory elements (e.g., ROM, storage class memory (SCM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the data storage unit 370 may incorporate electronic, magnetic, optical, and/or other types of storage media. Note that the data storage unit 370 can have a distributed architecture, where various components (e.g. second, remote memory 370B) are situated remote from the computing device 310, but can be accessed by the processing unit 360.

The software in the data storage unit 370 may include one or more separate programs, each of which comprises an ordered listing of executable instructions for implementing logical functions. The software in the data storage unit 370 may include a suitable operating system, compiler, source code, and one or more applications in accordance with exemplary embodiments. The application comprises numerous functional components for implementing the features and operations of the exemplary embodiments. The application of the data storage unit 370 may represent various applications, computational units, logic, functional units, processes, operations, virtual entities, and/or modules in accordance with exemplary embodiments, but the application is not meant to be a limitation.

The processing unit 360 may be adapted to control wireless connection of the computing device 310 to a wireless access point 320,330 in accordance with one or more aspects of the present invention.

The data storage unit 370 may store geographical information associated with first 320 and second 330 wireless access points. For instance, the geographical information comprises, for each wireless access point 320,330, signal strength information representative of a variation of the wireless access point's signal strength with location. Put another way, the geographical information comprises, for each wireless access point 320,330, signal strength information which may be used to represent or determine a geographical range or area for each wireless access point 320,330, wherein within the area the wireless access point's signal strength exceeds a predetermined minimum value. Thus, the geographical information may be representative of a first geographical range or area 320B within which the signal strength of the first wireless access point 320 will exceed a minimum signal strength threshold value. Similarly, the geographical information may be representative of a second geographical range or area 330B within which the signal strength of the second wireless access point 330 will exceed the minimum signal strength threshold value. Thus, using such geographical information, the computing device 310 may determine if its location is within the first 320B or second 330B geographical range/area so as to ascertain if the first 320 and second 330 wireless access point is available at that location.

Upon determining the first 320 or second 330 wireless access point is available at the device location, the processing unit 360 may control the wireless communication interface 350 according to instructions and/or data stored by the processing unit 360 and/or the data storage unit 370. In other words, the device 310 may store computer-readable instructions which are executable by the processing unit 360 to cause the processing unit 360 to perform operations for controlling wireless connection of the device 310 to the first 320 or second 330 wireless access point in accordance with a proposed embodiment.

Figure 4:
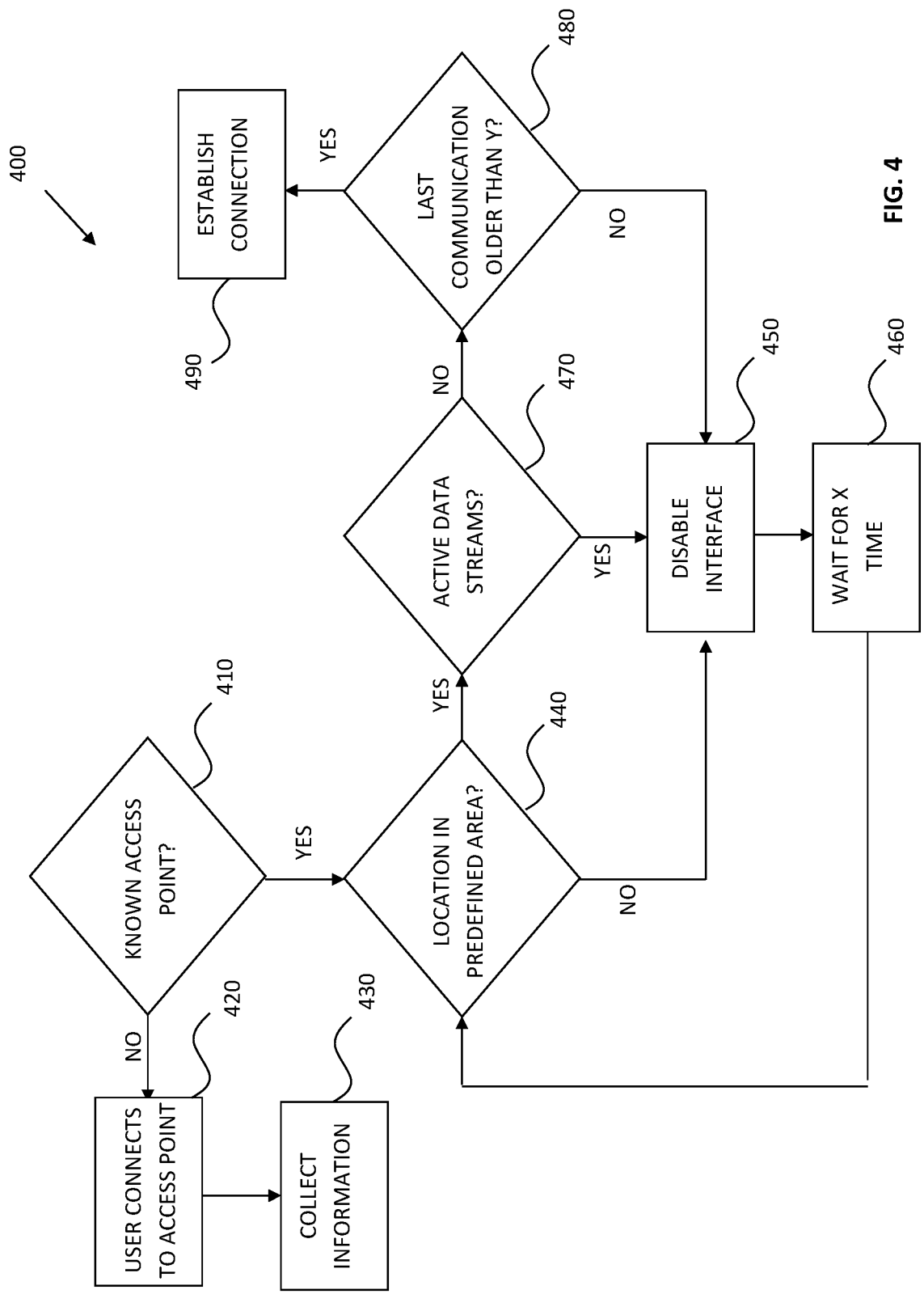
FIG. 4 is a flow chart illustrating a method of controlling wireless connection of a device to a wireless access point, in accordance with one or more aspects of the present invention.

This will be explained in more detail with the aid of FIG. 4, which depicts a flowchart of an example embodiment of a method 400 of controlling wireless connection of the device 310 to a wireless access point.

The method may start in step 110 upon discovery of a wireless access point by the device 310. For example, this may occur automatically when the device 310 enters an operating range of a wireless access point (e.g. an area surrounding the wireless access point within which the wireless signal strength exceeds an acceptable minimum value).

In step 410, the device 310 determines if the discovered wireless access point is a known wireless access point. Such determination may, for example, be made by comparing the location of the device 310 with geographical information associated with a set of known wireless access points, wherein the geographical information may be stored by the data storage unit 370.

Here, the location of the device may, for instance, be determined using location information from at least one of: the discovered wireless access point; a global positioning system; mobile communication mast of a mobile communication network; and recent data communication activity.

If it is determined in step 410 that the discovered wireless access point is not a known wireless access point, the method proceeds to step 420 in which the user manually connects the computing device 310 to the wireless access point. After connecting to the wireless access point, information about the wireless access point (such as geographical information including location and signal strength information) is collected in step 430 for subsequent addition to the geographical information stored by the data storage unit 370. In other words, information about a new and/or unknown wireless access point may be collected and added to that already stored for the known access points. The information may, for example, relate to device location and associated signal strength for the wireless access point. By collecting such information for various device locations, signal strength information representative of a variation of the wireless access point's signal strength with location may be generated and stored (e.g. in the data storage unit 370) for the newly identified wireless access point.

If it is determined in step 410 that a known wireless access point is available (e.g. that the discovered wireless access point is a known access point), the exemplary method proceeds to step 440.

In step 440, using the determined location of the computing device 310, the device 310 determines the discovered wireless access point's signal strength at the location with reference to the geographical information associated with the discovered wireless access point. Thus, step 440 checks to see if the computing device 310 is within "geofenced" area for which the signal strength exceeds a minimum acceptable signal strength threshold value for example.

If the signal strength at the location of the device 310 does not exceed a minimum signal strength threshold value, it may be determined that the wireless access point is not available (e.g. the computing device 310 is not within a predefined "geofenced" area for the wireless access point), and the method then proceeds to step 450 in which the processing unit 360 disables the wireless communication interface 350 so as to prevent wireless connection of the device to the known wireless access point.

After disabling the wireless communication interface in step 450, the method may proceed to step 460, in which the computing device 310 waits for a predetermined amount X of time, before returning to step 440 once again.

If, in step 440, it is determined that the signal strength at the location of the device 310 exceeds a minimum signal strength threshold value, it may be determined that the wireless access point is available (e.g. the computing device 310 is within a predefined "geofenced" area for the wireless access point) and the method may then proceed to step 470.

In step 470, the processing unit 360 determines if the device has any active data streams or connections. In other words, the computing device 310 checks to see if it is undertaking data communications which could be interrupted by establishing a new wireless connection for example.

If, in step 470, it is determined that the computing device 310 does have an active data stream or connection, it may be concluded that the time elapsed since a most recent data communication activity of the computing device 310 is essentially zero (or minimum value that does not exceed an acceptable idle time threshold value) and the method proceeds to step 450 (in which the processing unit 360 disables the wireless communication interface 350 so as to prevent wireless connection of the device to the known wireless access point).

If, in step 470, it is determined that the computing device 310 does not have any active data streams or connections, the method proceeds to step 480 in which the computing device 310 determines if a time elapsed a since a last (e.g. most recent) data communication activity exceeds an acceptable idle time threshold value. Step 480 thus checks to see if an adequate amount Y of time has elapsed since the last communication activity which may help to minimize the risk of a new wireless connection interrupting or negatively impacting data communication activity of the computing device 310. A time elapsed may, for instance, be determined based on the time of a last (e.g. most recent) data transmission or reception made by the computing device 310. This may be done by checking a data transmission log of the device 310 or communication interface 350, or by referencing a time stamp of the most recent data packet transmitted/received by the computing device 310.

If, as a result of undertaking step 480, it is determined that the time elapsed is less than an acceptable idle time threshold value, the method proceeds to step 450 in which the processing unit 360 disables the wireless communication interface 350 so as to prevent wireless connection of the device to the known wireless access point. In this way, wireless connection of the device to the known wireless access point is prevented, thereby avoiding potential interruption of an active data communication.

If, on the other hand, it is determined in step 480 that the time elapsed is greater than an acceptable idle time threshold value, the method proceeds to step 490 in which the processing unit 360 enables the wireless communication interface 350 so as permit wireless connection of the device 310 to the known wireless access point.

It will therefore be appreciated that steps 470 and 480 may comprise the concept of determining a time elapsed since a most recent data communication activity of the device and this may be done by checking for active data streams/connections and/or determining a time elapsed since the last data transmission/reception made by the computing device 310.

As has been explained, the method 400 may wait for a predetermined amount of time after disabling the wireless communication interface 350 and then loop back to perform repeated discovery of a known wireless access point and/or repeated checking of the device location with reference to predefined operating ranges (e.g. geofenced areas) of known wireless access points.

At this point, it is noted that the above described embodiment of the method 400 is merely another example embodiment of proposed method and that several extensions thereto and/or variations thereon will be immediately apparent to the skilled person.

It will be appreciated that there are disclosed herein inventive features for controlling wireless connection of a computing device having a wireless communication interface to a wireless access point. The concepts include checking if a known access point is available based on the location of the computing device. By identifying that the computing is within a predetermined range of a known wireless access point, for example, inappropriate or ineffective connection to wireless access point that only provides a weak signal strength can be avoided. This may prevent a computing device inadvertently automatically connecting to a wireless access point as a computing device travels through the edge of a wireless access point's weak coverage area.

Other disclosed concepts include checking that a predetermined acceptable amount of time has elapsed since the most recent data communication activity of the computing device. By checking that no data communication activity has been undertaken by the computing device for certain amount of time, for example, potential interruption of active communication links may be avoided. This may prevent a computing device automatically connecting to a wireless access point as a computing device briefly travels in and then out of a coverage range of a known wireless access point.

One or more embodiments of the inventive concepts disclosed herein may comprise a sub-routine or algorithm which is adapted to run as a background task on a computing device. The routine or algorithm may be arranged to execute when movement of the computing device is sensed and indicates the computing device is moving between different locations, e.g. the user is travelling and may be using data services for media or browsing and the interruption of joining a wireless access point would inconvenience or interrupt the user. Embodiments may therefore dynamically and/or intelligently disable the wireless communication interface in such instances. This may provide benefits including the saving of battery power, whilst maintaining the primary benefit of keeping a consistent connection whilst moving between locations through a number of public wireless access networks. Further. Embodiments may be adapted to be disabled when the computing device stops moving between locations, thus enabling the convenience of using conventional auto-join/auto-connection routines.

One or more embodiments of the present invention may be employed in conventional computing devices and/or integrated with existing operating systems. No front end or user interface may be present for proposed embodiments, thus enabling a user to use a computing device as they would have normally done. A user of a computing device employing an embodiment may therefore be entirely unaware of an embodiment being implemented beyond the device seemingly managing connection to available wireless access points in an improved manner.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling wireless connection of a device having a wireless communication interface to a wireless access point, the method comprising:
determining, by the device in communication with a first access point, if a known wireless access point is available by comparing a determined location of the device with geographical information associated with a set of known wireless access points;
based on determining that the known wireless access point is available, determining, by the device, whether to initiate a connection to the known wireless access point and terminate the connection with the first access point based on monitoring a time elapsed since a most recent data communication activity of the device via an active data stream or an active connection from the first access point to;
determining, based on the monitoring, that time elapsed is less than an idle time threshold value; and
disabling the wireless communication interface to maintain the active data stream or the active connection with the first access point and prevent disruption of the active data stream or the active connection.

2. The method of claim 1, wherein the geographical information comprises, for each wireless access point of the set of known wireless access points, signal strength information representative of a variation of the wireless access point's signal strength with location, and wherein the determining if a known wireless access point is available comprises:
determining the wireless access point's signal strength at the determined location based on the signal strength information for the wireless access point; and determining the wireless access point is available if the signal strength at the determined location exceeds a minimum signal strength threshold value.

3. The method of claim 1, further comprising:
determining, by the device, if the wireless access point is a known wireless access point based on the set of known wireless access points; and
if it is determined that the wireless access point is not known, adding the wireless access point to the set of known wireless access points and generating geographical information associated with the wireless access point.

4. The method of claim 3, wherein the generating geographical information associated with the wireless access point comprises:
determining the wireless access point's signal strength at the location of the device based on one or more measurements for signal strength of signals received by the wireless communication interface of the device; and
generating signal strength information for the wireless access point based on the determined signal strength.

5. The method of claim 1, further comprising:
determining, by the device, if the wireless access point is a known wireless access point based on the set of known wireless access points; and
if it is determined that the wireless access point is known, generating, by the device, geographical information associated with the wireless access point.

6. The method of claim 1, wherein the determining a time elapsed since a most recent data communication activity of the device comprises:
determining that the device has the active data stream or the active connection; and
determining the time elapsed to be a value that is less than the idle time threshold value.

7. The method of claim 1, further comprising:
determining, by the device, the location of the device using location information from at least one of: a wireless access point; a global positioning system; mobile communication mast of a mobile communication network; and the recent data communication activity.

8. The method of claim 1 further comprising:
enabling the wireless communication interface after predetermined amount of time has elapsed since disabling the wireless communication interface.

9. A computer program product for controlling wireless connection of a device having a wireless communication interface to a wireless access point, the computer program product comprising:
a computer readable storage medium having program instructions embodied therewith, the program instructions executable by a processing unit to cause the processing unit to perform a method comprising:
determining, by the device in communication with a first access point, if a known wireless access point is available by comparing a determined location of the device with geographical information associated with a set of known wireless access points;
based on determining that the known wireless access point is available, determining, by the device, whether to initiate a connection to the known wireless access point and terminate the connection with the first access point based on monitoring a time elapsed since a most recent data communication activity of the device via an active data stream or an active connection from the first access point to;
determining, based on the monitoring, that time elapsed is less than an idle time threshold value; and
disabling the wireless communication interface to maintain the active data stream or the active connection with the first access point and prevent disruption of the active data stream or the active connection.

10. The computer program product of claim 9, wherein the geographical information comprises, for each wireless access point of the set of known wireless access points, signal strength information representative of a variation of the wireless access point's signal strength with location, and wherein the determining if a known wireless access point is available comprises:
determining the wireless access point's signal strength at the determined location based on the signal strength information for the wireless access point; and
determining the wireless access point is available if the signal strength at the determined location exceeds a minimum signal strength threshold value.

11. The computer program product of claim 9, wherein the program instructions executed by the processing unit cause the processing unit to perform the method, which further includes:
determining, by the device, if the wireless access point is a known wireless access point based on the set of known wireless access points; and
if it is determined that the wireless access point is not known, adding the wireless access point to the set of known wireless access points in generating geographical information associated with the wireless access point.

12. The computer program product of claim 11, wherein the generating geographical information associated with the wireless access point comprises:
determining the wireless access point's signal strength at the location of the device based on one or more measurements for signal strength of signals received by the wireless communication interface of the device; and
generating signal strength information for the wireless access point based on the determined signal strength.

13. The computer program product of claim 9, wherein the program instructions executed by a processing unit cause the processing unit to perform the method, which further includes:
determining, by the device, if the wireless access point is a known wireless access point based on the set of known wireless access points; and
if it is determined that the wireless access point is known, generated by the device, geographical information associated with the wireless access point.

14. The computer program product of claim 9, wherein the determining a time elapsed since a most recent data communication activity of the device comprises:
determining that the device has the active data stream or the active connection; and
determining the time elapsed to be a value that is less than the idle time threshold value.

* * * * *